(12) United States Patent
Gutsmiedl

(10) Patent No.: US 9,347,542 B2
(45) Date of Patent: May 24, 2016

(54) PARALLEL-AXIS HELICAL DIFFERENTIAL ASSEMBLY

(75) Inventor: Peter Gutsmiedl, Bad Homburg (DE)

(73) Assignee: American Axle & Manufacturing, Inc., Detroit, MI (US)

( * ) Notice: Subject to any disclaimer, the term of this patent is extended or adjusted under 35 U.S.C. 154(b) by 1705 days.

(21) Appl. No.: 12/569,078

(22) Filed: Sep. 29, 2009

(65) Prior Publication Data

US 2010/0081535 A1 Apr. 1, 2010

Related U.S. Application Data

(60) Provisional application No. 61/101,355, filed on Sep. 30, 2008.

(51) Int. Cl.
 *F16H 48/28* (2012.01)
 *F16H 48/285* (2012.01)
 *F16H 48/10* (2012.01)

(52) U.S. Cl.
 CPC ............. *F16H 48/285* (2013.01); *F16H 48/10* (2013.01)

(58) Field of Classification Search
 None
 See application file for complete search history.

(56) References Cited

U.S. PATENT DOCUMENTS

| | | | |
|---|---|---|---|
| 1,406,627 A | 2/1922 | Elbertz |
| 1,409,535 A | 3/1922 | Elbertz |
| 1,938,649 A | 12/1933 | Welsh |
| 2,142,575 A | 1/1939 | Spicacci |
| 2,269,734 A | 1/1942 | Powell |
| 2,972,265 A | 2/1961 | Walter |
| 3,095,761 A | 7/1963 | Hilado |
| 3,375,736 A | 4/1968 | Saari |
| 4,916,978 A | 4/1990 | Razelli et al. |
| 5,055,096 A | 10/1991 | Riemscheid et al. |
| 5,122,101 A | 6/1992 | Tseng |
| 5,147,252 A | 9/1992 | Mace et al. |
| 5,169,370 A | 12/1992 | Dye et al. |
| 5,194,054 A | 3/1993 | Amborn et al. |
| 5,221,238 A | 6/1993 | Bawks et al. |
| 5,244,440 A | 9/1993 | Ichiki et al. |
| 5,292,291 A | 3/1994 | Ostertag |
| 5,295,923 A | 3/1994 | Takefuta |
| 5,302,159 A | 4/1994 | Dye et al. |
| 5,310,389 A | 5/1994 | Sato |
| 5,346,443 A | 9/1994 | Crysler et al. |
| 5,366,422 A | 11/1994 | Dye et al. |

(Continued)

FOREIGN PATENT DOCUMENTS

DE 3906650 A1 9/1990
JP 2266142 A 10/1990

*Primary Examiner* — Erin D Bishop
(74) *Attorney, Agent, or Firm* — Harness, Dickey & Pierce, P.L.C.

(57) ABSTRACT

A differential assembly with a case assembly, a plurality of first and second shoes, a plurality of first and second helical pinions, and first and second side gears. The case assembly defines first and second apertures and includes a case body and a case cap. The first and second shoes are integrally formed with the case body and the case cover, respectively. The first pinions are meshingly engaged to the first side gear and have pin portions that are received into the first apertures. The second pinions are meshingly engaged to the second side gear and have pin portions that are received into the second apertures. The first and second helical pinions frictionally engage an interior wall surface of the case body in response to a reaction force generated by meshing engagement with the first and second side gears, respectively, to limit differential motion between the first and second side gears.

24 Claims, 10 Drawing Sheets

(56) References Cited

U.S. PATENT DOCUMENTS

| | | |
|---|---|---|
| 5,389,048 A | 2/1995 | Carlson |
| 5,415,599 A | 5/1995 | Cilano |
| 5,415,601 A | 5/1995 | Cilano |
| 5,433,673 A | 7/1995 | Cilano |
| 5,443,431 A | 8/1995 | Cilano |
| 5,458,546 A | 10/1995 | Teraoka |
| 5,462,497 A | 10/1995 | Cilano |
| 5,492,510 A | 2/1996 | Bowerman |
| 5,518,464 A | 5/1996 | Teraoka |
| 5,533,944 A | 7/1996 | Ichiki et al. |
| 5,540,300 A | 7/1996 | Downs et al. |
| 5,554,081 A | 9/1996 | Bowerman |
| 5,562,562 A | 10/1996 | Teraoka |
| 5,580,326 A | 12/1996 | Teraoka |
| 5,620,389 A | 4/1997 | Sato |
| 5,624,344 A | 4/1997 | Yehl et al. |
| 5,632,704 A | 5/1997 | Yamazaki et al. |
| 5,637,050 A | 6/1997 | Chludek |
| 5,655,987 A | 8/1997 | Bowerman et al. |
| 5,658,214 A * | 8/1997 | Hofstetter et al. ............ 475/249 |
| 5,669,844 A | 9/1997 | Homan et al. |
| 5,711,737 A | 1/1998 | Teraoka et al. |
| 5,713,811 A | 2/1998 | Fischnaller et al. |
| 5,713,812 A | 2/1998 | Hiraishi et al. |
| 5,730,679 A | 3/1998 | Ichiki |
| 5,733,216 A | 3/1998 | Bowerman |
| 5,785,624 A | 7/1998 | Mayr |
| 5,823,907 A | 10/1998 | Teraoka et al. |
| 5,839,327 A | 11/1998 | Gage |
| 5,842,946 A | 12/1998 | Ichiki |
| 5,868,643 A | 2/1999 | Teraoka et al. |
| 5,951,431 A | 9/1999 | Downs et al. |
| 5,957,801 A | 9/1999 | Barnes, II |
| 5,971,882 A | 10/1999 | Nishiji |
| 5,976,051 A | 11/1999 | Madsack et al. |
| 6,013,004 A | 1/2000 | Gage et al. |
| 6,053,838 A | 4/2000 | Gage |
| 6,066,064 A | 5/2000 | Nishiji |
| 6,139,462 A | 10/2000 | Gage et al. |
| 6,325,737 B1 | 12/2001 | Zinke et al. |
| 6,378,761 B2 * | 4/2002 | Eulenstein et al. ............ 228/246 |
| 6,634,979 B1 | 10/2003 | Quaife |
| 6,817,961 B2 | 11/2004 | Moore et al. |
| 6,849,021 B2 * | 2/2005 | Krzesicki et al. ............. 475/233 |
| 6,958,030 B2 | 10/2005 | DeGowske |
| 6,991,576 B2 | 1/2006 | Moore et al. |
| 7,022,040 B2 | 4/2006 | DeGowske et al. |
| 7,022,041 B2 | 4/2006 | Valente |
| 7,108,428 B2 | 9/2006 | Ason et al. |
| 7,115,058 B2 | 10/2006 | Duncan |
| 7,137,921 B2 | 11/2006 | DeGowske |
| 7,147,585 B2 | 12/2006 | Valente |
| 7,155,824 B2 | 1/2007 | Prucher |
| 7,201,696 B2 | 4/2007 | DeGowske |
| 7,211,020 B2 | 5/2007 | Gohl et al. |
| 7,232,397 B2 | 6/2007 | Valente |
| 7,232,399 B2 | 6/2007 | Valente |
| 7,258,645 B2 | 8/2007 | Church et al. |
| 7,278,948 B2 | 10/2007 | Cradit |
| 7,320,659 B2 | 1/2008 | Pritchard et al. |
| 7,377,598 B2 | 5/2008 | Doud et al. |
| 7,390,279 B2 | 6/2008 | Cradit |
| 7,425,185 B2 | 9/2008 | Donofrio et al. |
| 7,445,575 B2 | 11/2008 | Capito |
| 7,534,187 B2 | 5/2009 | Donofrio et al. |
| 7,572,202 B2 | 8/2009 | Donofrio et al. |
| 2002/0025878 A1 | 2/2002 | Kam |
| 2002/0032094 A1 | 3/2002 | Kanazawa |
| 2002/0134605 A1 | 9/2002 | Bowen et al. |
| 2002/0160875 A1 | 10/2002 | Kanazawa et al. |
| 2004/0020742 A1 | 2/2004 | Cook et al. |
| 2004/0023742 A1 | 2/2004 | Krzesicki et al. |
| 2004/0077451 A1 | 4/2004 | Kam |
| 2004/0176208 A1 | 9/2004 | Asahi |
| 2005/0009660 A1 | 1/2005 | Nishiji |
| 2005/0176549 A1 | 8/2005 | Okada |
| 2005/0266954 A1 | 12/2005 | Yoshimura |
| 2006/0009324 A1 | 1/2006 | Keuth |
| 2006/0100054 A1 | 5/2006 | Maruyama et al. |
| 2007/0023252 A1 | 2/2007 | Sachsenmaier et al. |
| 2007/0095628 A1 | 5/2007 | Niederbacher |
| 2007/0181843 A1 * | 8/2007 | Welty et al. .................... 251/368 |
| 2009/0088288 A1 | 4/2009 | Nakajima |
| 2009/0105032 A1 | 4/2009 | Hirota et al. |
| 2009/0192063 A1 | 7/2009 | Gray et al. |
| 2009/0211869 A1 | 8/2009 | Sachsenmaier et al. |

* cited by examiner

US 9,347,542 B2

PARALLEL-AXIS HELICAL DIFFERENTIAL ASSEMBLY

CROSS-REFERENCE TO RELATED APPLICATIONS

This application claims the benefit of U.S. Provisional Patent Application Ser. No. 61/101,355 filed Sep. 30, 2008, which is entitled "Parallel Axis Helical Differential Assembly". The disclosure of the aforementioned patent application is hereby incorporated by reference as if fully set forth in its/their entirety herein.

INTRODUCTION

The present invention generally relates to a parallel-axis helical differential assembly.

Parallel-axis helical differentials of the type used in automotive drivelines generally include a housing rotatively driven by a member, such as a pinion or a spline, and a gearset that is supported in the housing and which interconnects a pair of coaxial output shafts. The gearset typically includes a pair of side gears fixed to end portions of the output shafts and meshed sets of pinions respectively meshed with the side gears. The pinions are commonly supported for rotation in longitudinal gear pockets formed in the housing. The gear pockets are circumferentially arranged to support the meshed sets of pinions for rotation about pinion axes that are parallel to the rotary axis shared by the side gear, the housing and the output shafts. A representative example of such a parallel-axis differential is disclosed in U.S. Pat. No. 5,711,737.

As is known, during high torque conditions the loading of the gearset may cause the ends of the pinions to move radially (i.e., tip), as well as axially. Tipping can cause the pinions to aggressively engage the surfaces of the gear pockets. Additionally, such movement of the ends of the pinions can result in misalignment of the gear contact surfaces, which can detrimentally impact tooth life and the efficiency of the gearset. Axial movement can also cause misalignment of the gear contact surfaces and can reduce the torque transmitting capability of the differential assembly. U.S. Pat. No. 6,013,004 discloses a parallel-axis differential that employs a plurality of discrete brake shoes that are mounted to each of the pinions to apply a frictional braking load to increase frictional resistance to speed differentiation. While such configuration has proven to be effective, there remains a need in the art for a differential assembly with fewer components, increased torque transmitting capability and increased wear resistance.

SUMMARY

This section provides a general summary of some aspects of the present disclosure and is not a comprehensive listing or detailing of either the full scope of the disclosure or all of the features described therein.

In one form, the teachings of the present disclosure provide a differential assembly with a case body, a plurality of first shoes, a plurality of first helical pinions, a case cover, a plurality of second shoes, a plurality of second helical pinions, a first side gear and a second side gear. The case body defines an interior cavity with an interior wall surface and a plurality of shoe recesses. Each of the first shoes is integrally formed with the case body and has a first pin aperture. Each of the first helical pinions is received in the interior cavity and has a first pin portion that is received in an associated one of the first pin apertures. The case cover is fixedly coupled to the case body. Each of the second shoes is integrally formed with the case cover and has a second pin aperture. Each of the second shoes is received in an associated one of the shoe recesses to index the case cover relative to the case body. Each of the second helical pinions is received in the interior cavity and has a second pin portion that is received in an associated one of the second pin apertures. The first side gear is received in the interior cavity and is meshingly engaged with the first helical pinions. The second side gear is received in the interior cavity and is meshingly engaged with the second helical pinions. The first and second helical pinions frictionally engage the interior wall surface of the case body in response to both radially outwardly and axially directed reaction forces generated by meshing engagement with the first and second side gears, respectively, to thereby limit differential motion between the first and second side gears.

In another form, the teachings of the present disclosure provide a differential assembly with a case assembly, a plurality of first shoes, a plurality of first helical pinions, a plurality of second shoes, a plurality of second helical pinions, a first side gear and a second side gear. The case assembly includes a case body and a case cover and defines a plurality of first pin apertures and a plurality of second pin apertures. The case body defining an interior cavity, which has an interior wall surface, and a plurality of shoe recesses. The case cover is fixedly coupled to the case body. The first shoes are integrally formed with the case body. The first helical pinions are received in the interior cavity and have a first pin portion that is received in an associated one of the first pin apertures. The second shoes are integrally formed with the case cover and are received in an associated one of the shoe recesses to index the case cover relative to the case body. The second helical pinions are received in the interior cavity. Each of the second helical pinions has a second pin portion that is received in an associated one of the second pin apertures. The first side gear is received in the interior cavity and is meshingly engaged with the first helical pinions. The second side gear is received in the interior cavity and is meshingly engaging the second helical pinions. The first and second helical pinions frictionally engage the interior wall surface of the case body in response to a reaction force generated by meshing engagement with the first and second side gears, respectively, to thereby limit differential motion between the first and second side gears.

In still another form, the teachings of the present disclosure provide a differential assembly with a case assembly, a plurality of first shoes, a plurality of first helical pinions, a case cover, a plurality of second shoes, a plurality of second helical pinions, a first side gear and a second side gear. The case assembly includes a case body and a case cover and defines a plurality of first and second pin apertures. The case body defines an interior cavity, which has an interior wall surface, and a plurality of shoe recesses. The case cover is fixedly coupled to the case body. The first shoes are integrally formed with the case body. Each of the first helical pinions is received in the interior cavity and has a first pin portion that is received in an associated one of the first pin apertures. The second shoes are integrally formed with the case cover. Each of the second helical pinions is received in the interior cavity and has a second pin portion that is received in an associated one of the second pin apertures. The first side gear is received in the interior cavity and is meshingly engaging the first helical pinions. The second side gear is received in the interior cavity and is meshingly engaging the second helical pinions. The first and second helical pinions frictionally engage the interior wall surface of the case body in response to a reaction force generated by meshing engagement with the first and second side gears, respectively, to thereby limit differential motion between the first and second side gears.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE VARIOUS EMBODIMENTS

Figure 1:
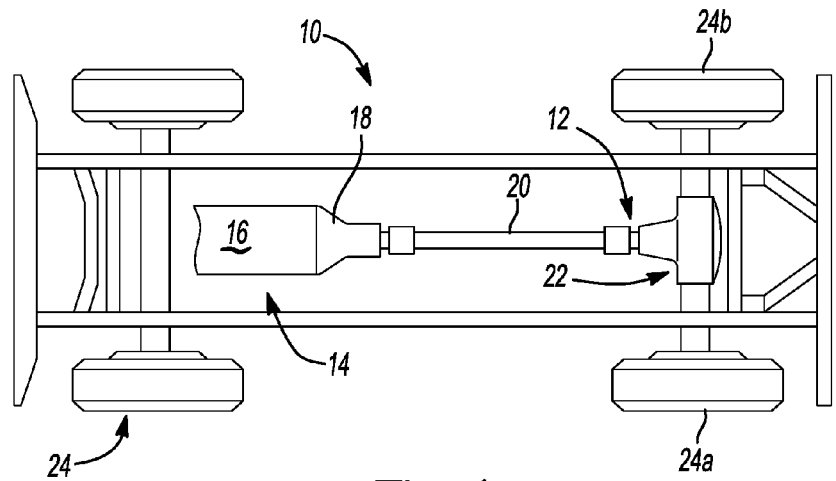
FIG. 1 is a schematic illustration of an exemplary vehicle having a differential assembly constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle 22 where it can be selectively apportioned in a predetermined manner to the left and right rear wheels 24a and 24b, respectively.

Figure 2:
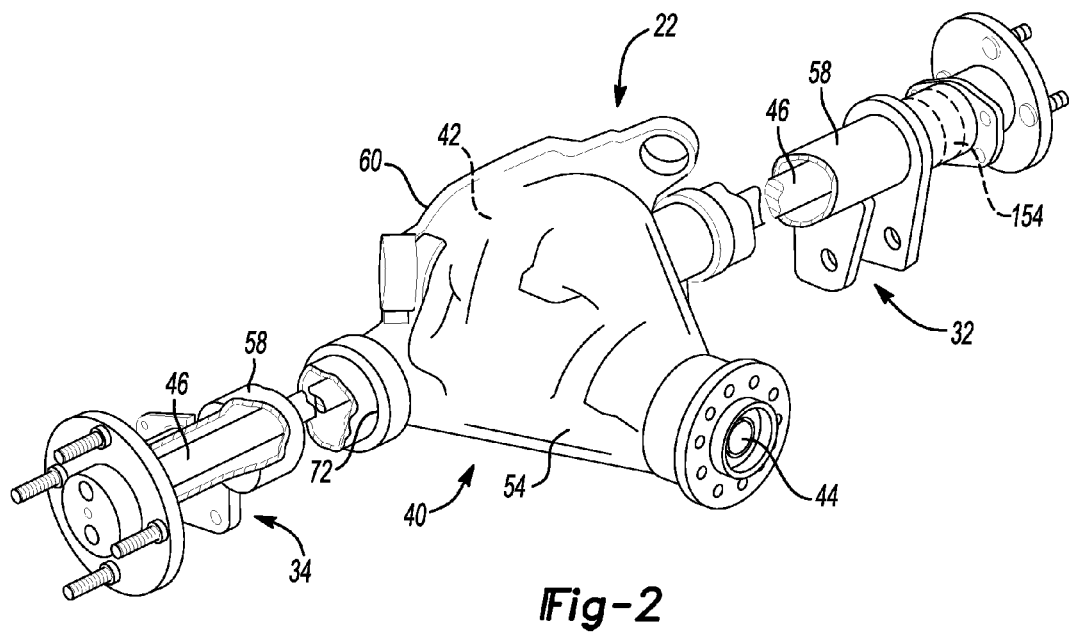
FIG. 2 is a perspective, partly sectioned view of a portion of the vehicle of FIG. 1, illustrating the rear axle assembly in more detail.
Figure 3:
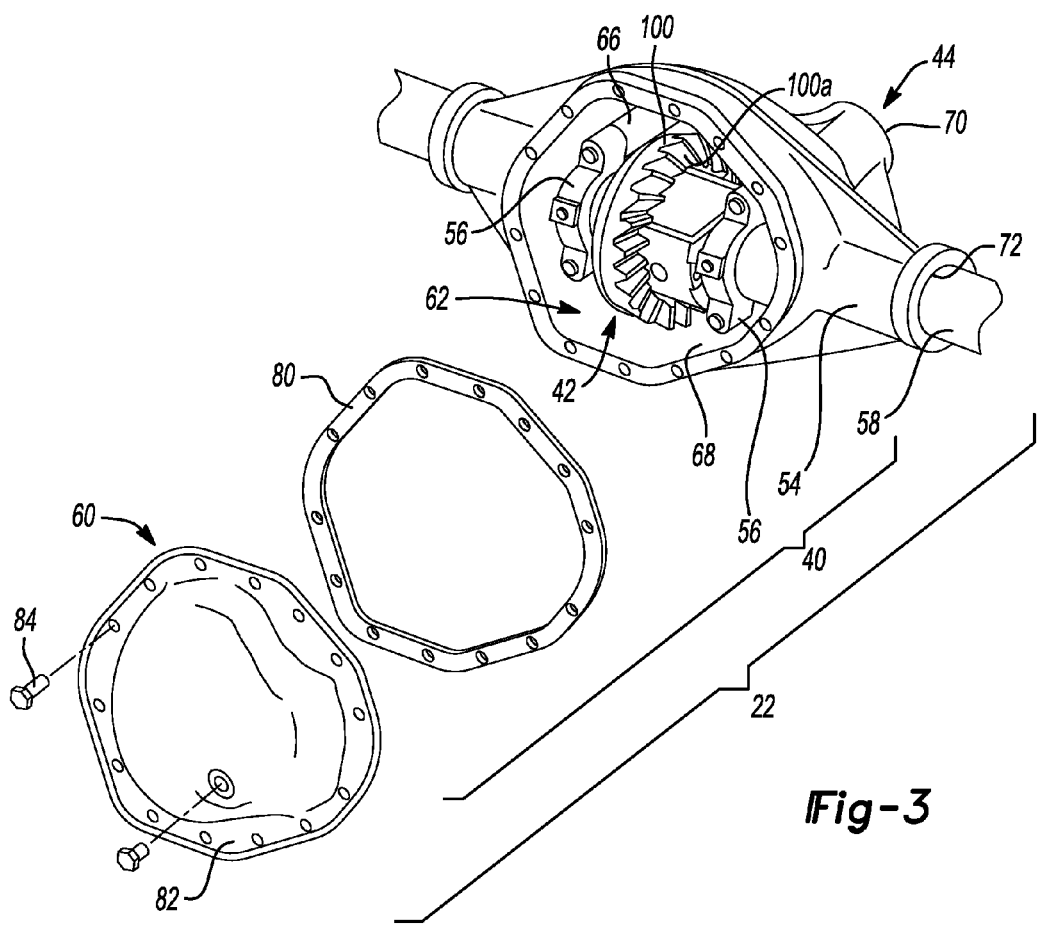
FIG. 3 is an exploded perspective view of a portion of the rear axle assembly.

With reference to FIGS. 2 and 3, the rear axle 22 can include an axle housing assembly 40, a differential assembly 42, an input pinion assembly 44, and a pair of axle shafts 46.

In the particular example provided, the axle housing assembly 40 includes a carrier housing 54, a pair of bearing caps 56, a pair of axle tubes 58 and a cover 60. The axle housing 40 can define an internal cavity 62 that forms a fluid sump in which a liquid lubricant (for lubricating the differential assembly 42 and input pinion assembly 44) is located. The carrier housing 54 can include a pair of bearing journals 66, a differential aperture 68, which can be disposed on a first side of the carrier housing 54, a pinion aperture 70, which can be disposed on a second side of the carrier housing 54 opposite the differential aperture 68, and a pair of axle tube apertures 72 that can intersect the opposite lateral sides of the internal cavity 62. The bearing caps 56 can be removably coupled to the bearing journals 66. The axle tubes 58 can be received in the axle tube apertures 72 and can be fixedly coupled to the carrier housing 54. The cover 60 can be fixedly coupled to the carrier housing 54 to close the differential aperture 68. In the example illustrated, a gasket 80 is disposed between a flange 82 on the cover 60 and the carrier housing 54 and a plurality of threaded fasteners 84 are received through the flange 82 and threadably engaged to the carrier housing 54 to fixedly couple the cover 60 to the carrier housing 54.

Figure 4:
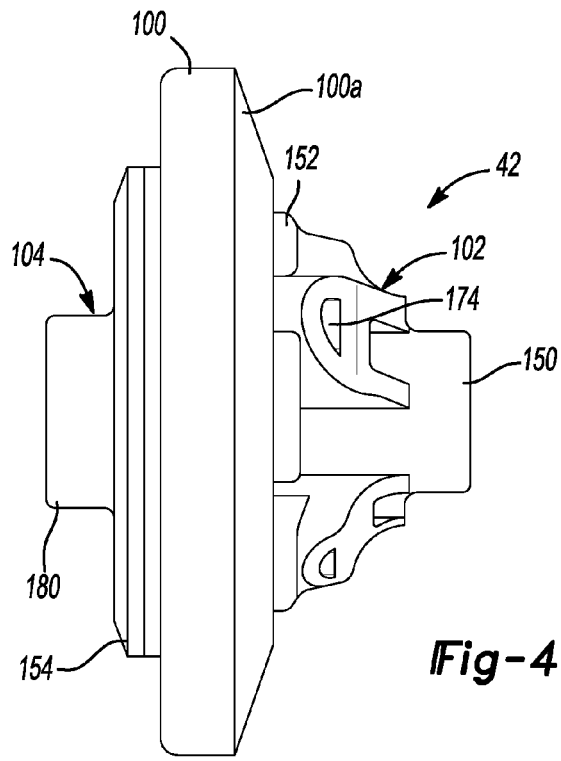
FIG. 4 is a side elevation view of a portion of the rear axle assembly, illustrating the differential assembly in greater detail.
Figure 6:
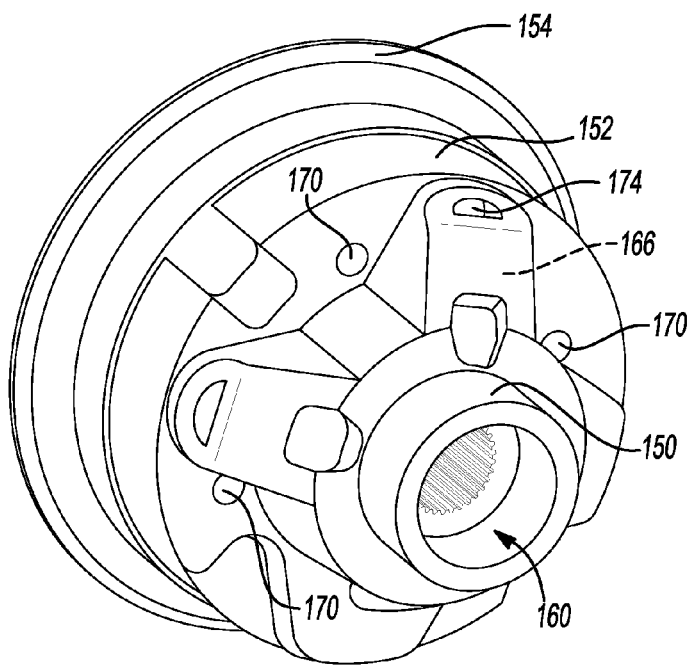
FIG. 6 is a perspective view of a portion of the differential assembly.
Figure 5:
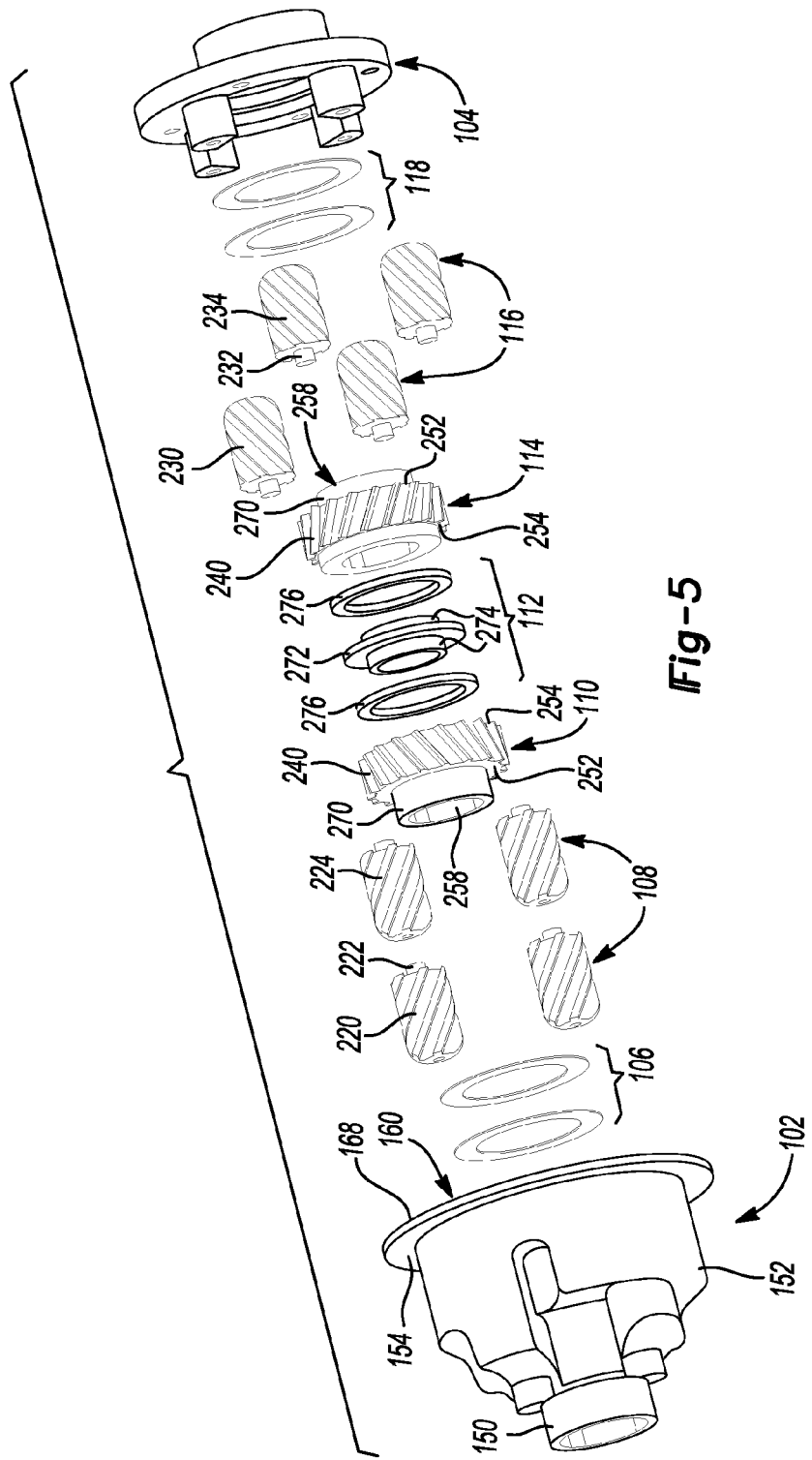
FIG. 5 is an exploded perspective view of a portion of the differential assembly.

In FIGS. 3 through 5, the differential assembly 42 can include a ring gear 100, a case body 102, a case cover 104, a first set of thrust washers 106, a set of first helical pinions 108, a first side gear 110, a second set of thrust washers 112, a second side gear 114, a set of second helical pinions 116 and a third set of thrust washers 118. The case body 102 and the case cover 104 can cooperate to define a case assembly CA. The ring gear 100 can include a plurality of ring gear teeth 100a that can be configured to matingly engage the teeth (not specifically shown) of the input pinion assembly 44 (FIG. 2). The ring gear 100 can be fixedly coupled to the case body 102 as will be described in greater detail, below.

In FIGS. 5 through 8, the case body 102 can include a first trunnion 150, an annular wall member 152, and an annular flange 154 that can extend radially outwardly from the annular wall member 152. The first trunnion 150 can be sized to be received in a respective one of the bearing journals 66 (FIG. 3) in the carrier housing 54 (FIG. 3). The annular wall member 152 can define a cup-shaped structure having an interior cavity 160, an interior wall surface 162, a plurality of first shoes 164 and a plurality of shoe recesses 166. The interior cavity 160 can have an open end 168 and can be sized to receive the first and second helical pinions 108 and 116, the first, second and third sets of thrust washers 106, 112 and 118 and the first and second side gears 110 and 114. The first shoes 164, which can be integrally formed with all or a portion of the remainder of the case body 102, can define a first pin aperture 170. The case body 102 can be heat treated and/or provided with a protective coating, over either its entire surface area or over selected portions of its surface area, to increase the durability, strength and/or wear resistance of selected surfaces of the case body 102. For example, a nitride layer can be formed onto the surfaces in the interior cavity 160 (including the first pin apertures 170 and the interior wall surface 162) in a heat treatment operation. An aperture 174 can be formed in the ends of the shoe recesses 166 opposite the annular flange 154 to facilitate ingress and egress of lubricant into/out of the interior cavity 160.

With reference to FIGS. 5 and 8 through 10, the case cover 104 can include a second trunnion 180, a cover member 182 and a plurality of second shoes 184. The second trunnion 180 can be sized to be received in a respective one of the bearing journals 66 (FIG. 3) in the carrier housing 54 (FIG. 3). The cover member 182 can be sized to be received into the open end 168 of the annular wall member 152.

Figure 11:
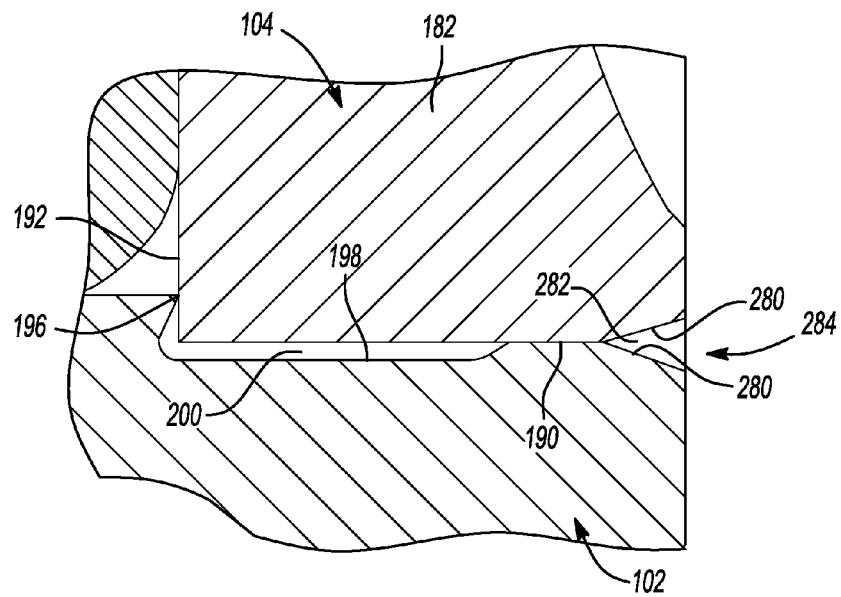
FIG. 11 is an enlarged view of a portion of FIG. 7, illustrating the joint between the case cover and the case body in more detail.

With specific reference to FIG. 11, the case body 102 can include a circumferentially extending retaining rib 190 that can engage the cover member 182 of the case cover 104 in a press-fit manner. The retaining rib 190 can extend in an unbroken manner, or could be formed by a plurality of discrete, circumferentially spaced-apart segments. An end face 192 of the cover member 182 of the case cover 104 can be abutted against a shoulder 196 formed on the case body 102. An undercut groove 198 can be disposed on the case body 102 between the between the retaining rib 190 and the shoulder 196 and can form a radial space 200 between the case body 102 and the case cover 104 when the two are assembled to one another.

Returning to FIGS. 5 and 8 through 10, the second shoes 184, which can be integrally formed with all or a portion of the remainder of the case cover 104, can define a second pin aperture 202. A pair of keying features can be employed to rotationally locate or index the case cover 104 relative to the case body 102. In the particular example provided, the keying features include the shoe recesses 166 and the second shoes 184. The shoe recesses 166 in the case body 102 can be sized and shaped to receive associated ones of the second shoes 184 of the case cover 104 in a transition fit matter to thereby rotationally locate or index the case cover 104 relative to the case body 102. The case cover 104 can be heat treated and/or provided with a protective coating, over either its entire surface area or over selected portions of its surface area, to increase the durability, strength and/or wear resistance of selected surfaces of the case cover 104. For example, a nitride layer can be formed onto the surfaces of the case cover 104 that are received into the interior cavity 160 (including the second pin apertures 202 and the end face 192) in a heat treatment operation. Apertures 210 can be formed through the cover member 182 to facilitate ingress and egress of lubricant into/out of the interior cavity 160.

Figure 7:
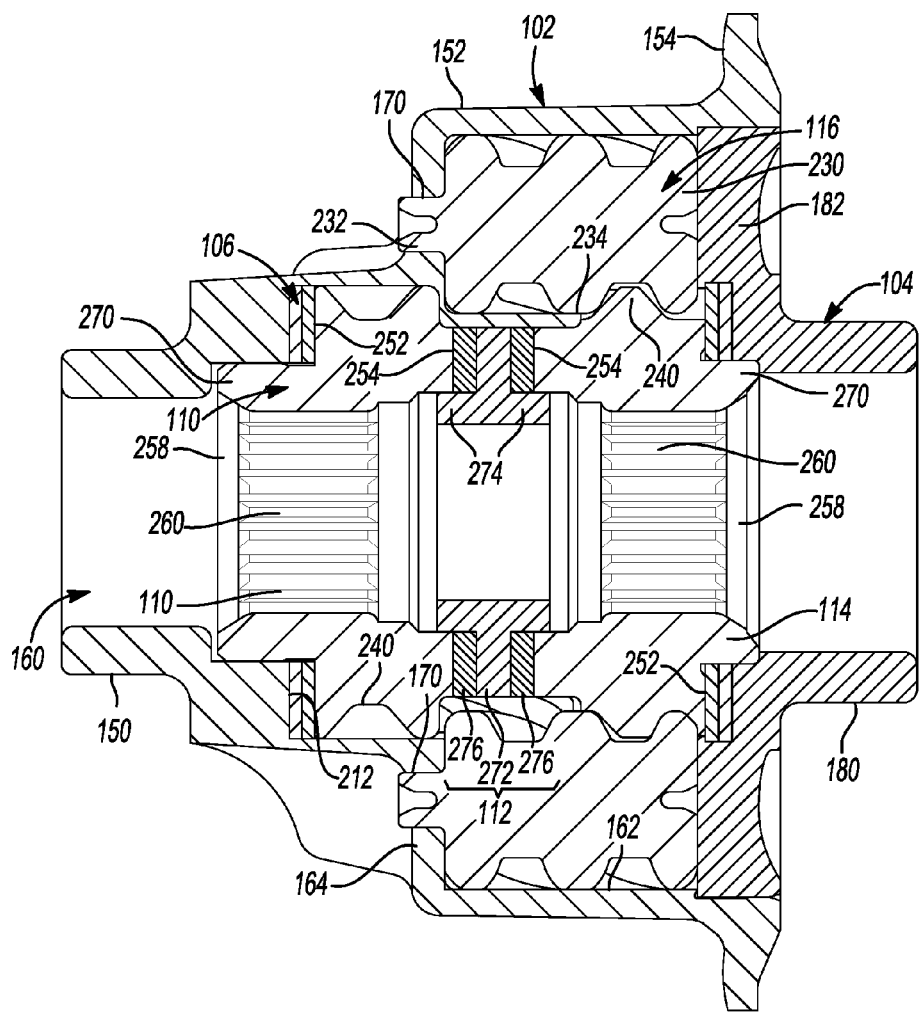
FIG. 7 is a longitudinal section view of the portion of the differential assembly illustrated in FIG. 6.

With reference to FIGS. 5 and 7, the first set of thrust washers 106 can include one or more washer-like structures that can be received into a counterbore 212 formed in the interior cavity 160. The first set of thrust washers 106 can be disposed between the case body 102 and the first side gear 110.

The set of first helical pinions 108 can include a first gear portion 220 and a first pin portion 222. The first gear portion 220 can include a plurality of first pinion teeth 224 that can be helically formed about the circumference of the first gear portion 220. The first pin portion 222, which can be received into the second pin apertures 202 in the second shoes 184, can be cylindrically shaped and can extend from an end of the first gear portion 220. The set of first helical pinions 108 can be received into the interior cavity 160.

Figure 8:
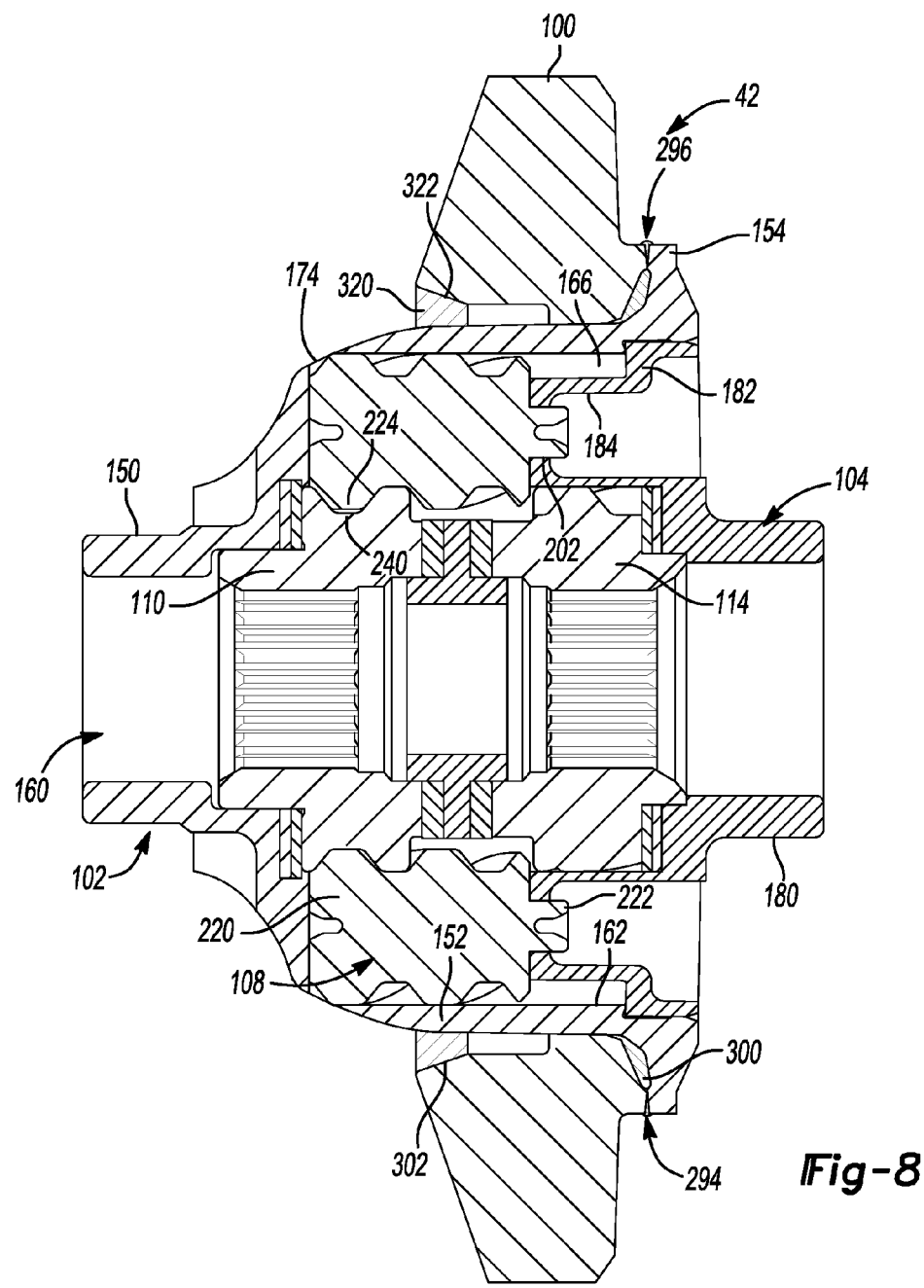
FIG. 8 is a longitudinal section view of the differential assembly.
Figure 9:
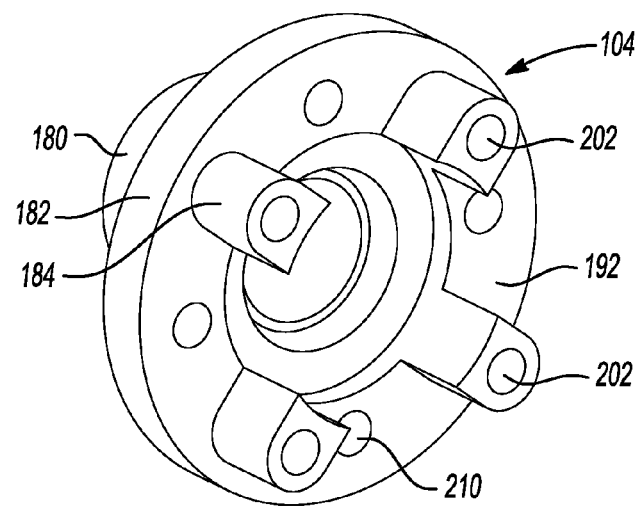
FIG. 9 is a perspective view of a portion of the differential assembly illustrating the case cover in more detail.

With reference to FIGS. 5 and 8, the set of second helical pinions 116 can include a second gear portion 230 and a second pin portion 232. The second gear portion 230 can include a plurality of second pinion teeth 234 that can be helically formed about the circumference of the second gear portion 230. The second pin portion 232, which can be received into the first pin apertures 170 in the first shoes 164, can be cylindrically shaped and can extend from an end of the second gear portion 230. The set of second helical pinions 116 can be received into the interior cavity 160.

The first and second side gears 110 and 114 can include a gear portion 240, a pair of thrust bearing surfaces 252 and 254, and an aperture 258 having a non-circular portion 260 that can be configured to axially slidably but non-rotatably receive an associated one of the axle shafts 46 (FIG. 2). The gear portions 240 of the first and second side gears 110 and 114 can be meshingly engaged to the first and second pinion teeth 224 and 234, respectively, of the first and second gear portions 220 and 230, respectively, of the first and second sets of helical pinions 108 and 116, respectively.

The thrust bearing surfaces 252 and 254 of the first side gear 110 can be configured to abut the first set of thrust washers 106 and the second set of thrust washers 112, respectively, while the thrust bearing surfaces 252 and 254 of the second side gear 114 can be configured to abut the third set of thrust washers 118 and the second set of thrust washers 112, respectively. The thrust bearing surfaces 252 and/or 254 can be formed of a wear resistant material, which could be plated onto the remainder of the first side gear 110 (e.g., nickel plated) or could be a discrete structure that could be fixedly coupled to a remainder of the first side gear 110.

In the example provided, the first and third sets of thrust bearings 106 and 118 are mounted about a collar 270 that extends from the gear portions 240 of the first and second side gears 110 and 114. Also in the example provided, the second set of thrust washers 112 includes a spacer 272 having a pair of collars 274 that are received into the apertures 258 in the first and second side gears 110 and 114 and onto which thrust washer elements 276 can be received.

Figure 10:
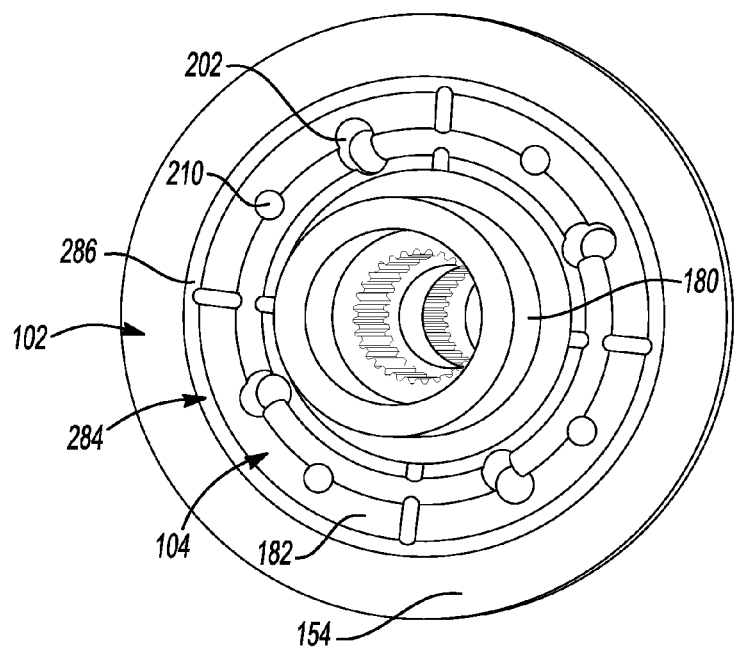
FIG. 10 is a perspective view of the portion of the differential assembly illustrated in FIG. 6 showing the case cover as welded to the case body.

With reference to FIGS. 5, 8 and 10, the case cover 104 can be welded to the case body 102 to inhibit relative rotation therebetween. We elected to employ a press-fit connection between the case cover 104 and the case body 102 as noted above as an intermediate step in the assembly of the differential assembly 42 to maintain the positioning of the components of the differential assembly 42 prior to the step in which the case cover 104 was welded to the case body 102. It will be appreciated, however, that other assembly techniques, such as threaded fasteners (not shown) could be employed to fixedly couple the case cover 104 to the case body 102.

With reference to FIGS. 10 and 11, the case cover 104 and the case body 102 can include weldment surfaces 280 that are configured to aid in the formation of a quality weld. In the particular example provided, the weldment surfaces 280 cooperate to form a generally V-shaped groove 282 about the perimeter of the joint 284 between the case cover 104 and the case body 102 and a groove weld 286 is employed to fixedly couple the case cover 104 and the case body 102 to one another.

Figure 12:
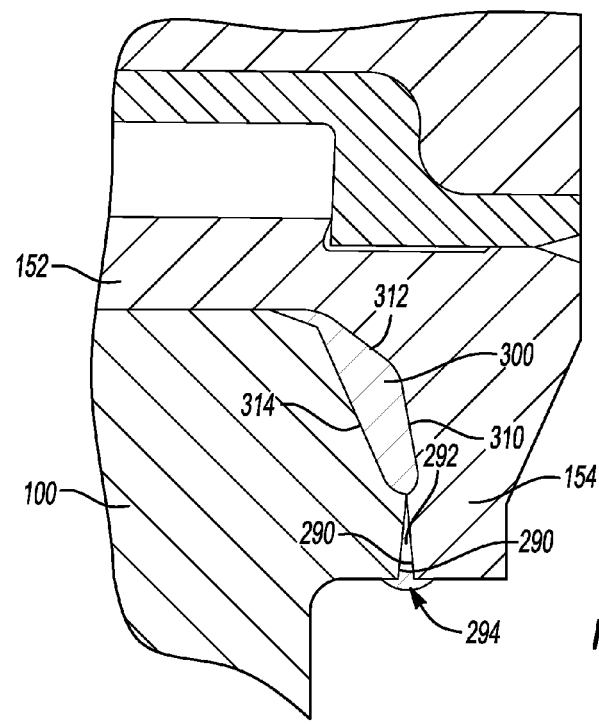
FIG. 12 is an enlarged view of a portion of the differential assembly illustrating the ring gear as coupled to the case body prior to welding the ring gear to the case body.

With reference to FIGS. 8 and 12, the ring gear 100 can be coupled to the annular flange 154 in any desired manner, such as via a plurality of threaded fasteners (not shown). In the example provided, the ring gear 100 is press-fit onto the annular wall member 152, abutted against the annular flange 154 and welded to the annular flange 154. The ring gear 100 and the annular flange 154 can include weldment surfaces 290 that can cooperate to form a groove, such as a V-shaped groove 292, about the perimeter of the joint 294 between the case body 102 and the ring gear 100. A groove weld 296 can be employed to fixedly couple the ring gear 100 to the annular flange 154.

Where desired, a filler material can be disposed between the case body 102 and the ring gear 100. For example, a first ring of filler material 300 can be disposed between the ring gear 100, the annular wall member 152 and the annular flange 154, while a second ring of filler material 302 can be disposed between the ring gear 100 and the annular wall member 152. The first ring of filler material 300 can be contoured to matingly engage a pair of intersecting chamfers 310 and 312 formed between the annular flange 154 and the annular wall member 152, as well as to engage a chamfered surface 314 on the ring gear 100. Construction in this manner can aid in the first ring of filler material 300 to the case body 102. The second ring of filler material 302 can be press-fit onto the annular wall member 152 and can include a chamfered surface 320 that can engage a corresponding chamfered surface 322 formed on the ring gear 100. It will be appreciated that the second ring of filler material 302 can be welded to the annular wall member 152 and/or the ring gear 100. It will be appreciated, however, that the first and second rings of filler material 300 and 302 can be formed directly onto the case body 102 in an appropriate process, such as welding.

During operation of the differential assembly 42, the first and second helical pinions 108 and 116 can frictionally engage the interior wall surface 162 of the case body 102 in response to radially outwardly and axially directed reaction forces generated by meshing engagement with the first and second side gears 110 and 114, respectively, to thereby limit differential motion between the first and second side gears 110 and 114.

Returning to FIGS. 7 and 8, the first and second helical pinions 108 and 116 can be relatively short. In this regard, the first gear portion 220 of the first helical pinions 108 can terminate at a location that is axially spaced apart from the gear portion 240 of the second side gear 114, while the second gear portion 230 of the second helical pinions 116 can terminate at a location that is axially spaced apart from the gear portion 240 of the first side gear 110. Accordingly, no portion of the first helical pinions 108 engages the second side gear 114 and no portion of the second helical pinions 116 engages the first side gear 110. The first and second helical pinions 108 and 116 can have an overall length that is relatively shorter than a distance spanning the gear portions 240 of the first and second side gears 110 and 114. Construction in this manner renders the first and second helical pinions 108 and 116 less prone to tipping.

Figure 13:
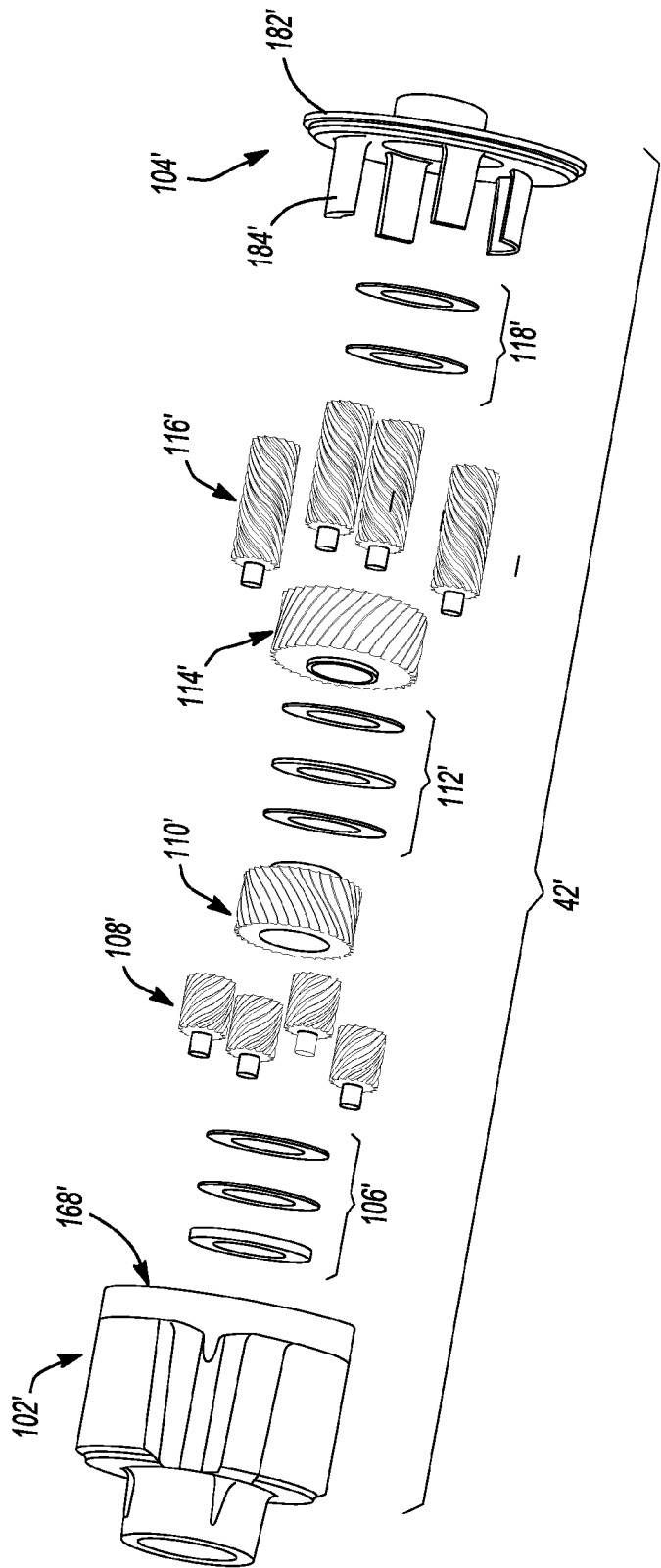
FIG. 13 is an exploded perspective view of another differential assembly constructed in accordance with the teachings of the present disclosure.
Figure 14:
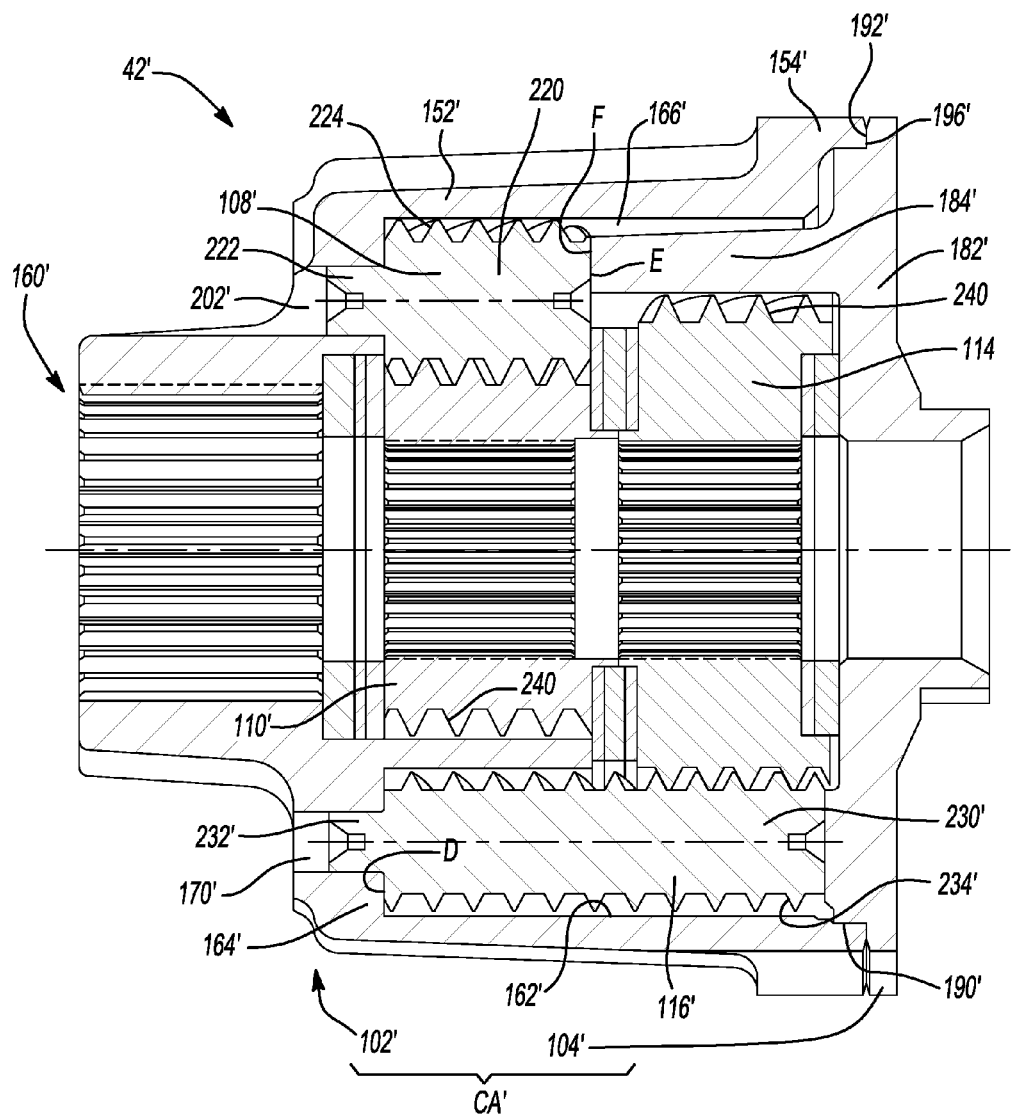
FIG. 14 is a longitudinal section view of the differential assembly of FIG. 13.

With reference to FIGS. 13 and 14, another differential assembly constructed in accordance with the teachings of the present disclosure is generally indicated by reference numeral 42'. The differential assembly 42' can include a case body 102', a case cover 104', a first set of thrust washers 106', a set of first helical pinions 108', a first side gear 110', a second set of thrust washers 112', a second side gear 114', a set of second helical pinions 116' and a third set of thrust washers 118'. The case body 102' and the case cover 104' can cooperate to define a case assembly CA'.

The case body 102' can include an annular wall member 152', and an annular flange 154' that can extend radially outwardly from the annular wall member 152'. The annular wall member 152' can define a cup-shaped structure having an interior cavity 160', an interior wall surface 162', a plurality of first shoes 164' and a plurality of shoe recesses 166'. The interior cavity 160' can have an open end 168' and can be sized to receive the first and second helical pinions 108' and 116', the first, second and third sets of thrust washers 106', 112' and 118' and the first and second side gears 110' and 114'. The first shoes 164' can be integrally formed with all or a portion of the remainder of the case body 102'. A plurality of first pin apertures 170' and a plurality of second pin apertures 202' can be formed in the case assembly CA'. In the particular example provided, both the first pin apertures 170' and the second pin apertures 202' are formed in the case body 102'. The case body 102' can be heat treated and/or provided with a protective coating, over either its entire surface area or over selected portions of its surface area, to increase the durability, strength and/or wear resistance of selected surfaces of the case body 102'. For example, a nitride layer can be formed onto the surfaces in the interior cavity 160' (including the first pin apertures 170'. The second pin apertures 202' and the interior wall surface 162') in a heat treatment operation.

The case cover 104' can include a cover member 182 and a plurality of second shoes 184'. The cover member 182' can be sized to be received into the open end 168' of the annular wall member 152'. The case cover 104' can be coupled to the case body 102' in any desired manner, such as by welding, to inhibit relative rotation therebetween.

The case body 102' can be configured in a manner that is similar to the case body described above. For example, the case body 102' can include a circumferentially extending retaining rib 190' that can engage the cover member 182' of the case cover 104' in a press-fit manner. The retaining rib 190' can extend in an unbroken manner, or could be formed by a plurality of discrete, circumferentially spaced-apart segments. An end face 192' of the cover member 182' of the case cover 104' can be abutted against an axial end face 196' formed on the case body 102'.

The second shoes 184', which can be integrally formed with all or a portion of the remainder of the case cover 104', can define a portion of a keying feature that can be employed to rotationally locate or index the case cover 104' relative to the case body 102'. In the particular example provided, the keying feature includes the shoe recesses 166'. The shoe recesses 166' in the case body 102' can be sized and shaped to receive associated ones of the second shoes 184' of the case cover 104' in a transition fit matter to thereby rotationally locate or index the case cover 104' relative to the case body 102'. The case cover 104' can be heat treated and/or provided with a protective coating, over either its entire surface area or over selected portions of its surface area, to increase the durability, strength and/or wear resistance of selected surfaces of the case cover 104'. For example, a nitride layer can be formed onto the surfaces of the case cover 104' that are received into the interior cavity 160' (including an end face F of the second shoes 184') in a heat treatment operation. If desired, apertures (not shown) can be formed through the cover member 182' to facilitate ingress and egress of lubricant into/out of the interior cavity 160'.

Each of the first, second and third sets of thrust washers 106', 112' and 118' can include one or more washer-like structures that can be disposed between components to control the fit in an axial direction between these components. Accordingly, those of skill in the art will appreciate that one or more of the washer-like structures may be selected based on the dimensions one or more of the components in a particular differential assembly 42'. Stated another way, the thickness of one or more of the washer-like structures can be tailored to cause a desired level of contact or clearance between associated components.

The set of first helical pinions 108' can be similar to the set of first helical pinions 108 (FIG. 8) described above and as such, a detailed discussion of the set of first helical pinions 108' need not be provided herein other than to note that as the second pin apertures 202' are formed in the case body 102', the orientation of the set of first helical pinions 108' is reversed to permit the first pin portions 222 to be received in the second pin apertures 202'.

The set of second helical pinions 116' can include a second gear portion 230' and a second pin portion 232'. The second gear portion 230' can include a plurality of second pinion teeth 234' that can be helically formed about the circumference of the second gear portion 230'. The second pin portion 232, which can be received into the first pin apertures 170' in the first shoes 164', can be cylindrically shaped and can extend from an end of the second gear portion 230'. The set of second helical pinions 116' can be received into the interior cavity 160'.

The first and second side gears 110' and 114' can be generally similar to the first and second side gears 110 and 114 (FIG. 8) described above and as such, a detailed discussion of the first and second side gears 110' and 114' need not be provided herein.

During operation of the differential assembly 42', the first and second helical pinions 108' and 116' can frictionally engage the interior wall surface 162' of the case body 102' in response to radially outwardly and axially directed reaction forces generated by meshing engagement with the first and second side gears 110' and 114', respectively, to thereby limit differential motion between the first and second side gears 110' and 114'. The first helical pinions 108' can be relatively short such that the first gear portion 220 of the first helical pinions 108' can terminate at a location that is axially spaced apart from the gear portion 240 of the second side gear 114. In contrast, the second helical pinions 108' can be relatively long such that the second gear portion 230' of the second helical pinions 116' axially overlaps (but does not meshingly engage) the gear portion 240 of the first side gear 110'. It will be appreciated that engagement of the first pin portions 222 in the first pin apertures 202' and abutment of the second shoes 184' against associated axial ends E of the pinions of the first set of helical pinions 108' limits tipping of the set of first helical pinions 108', while engagement of the second pin portions 232' in the first pin apertures 170' and abutment of the first shoes 164' against associated axial ends D of the helical pinions of the second set of helical pinions 116' limits tipping of the set of second helical pinions 116'. It will also be appreciated that sizing of the first, second and third sets of thrust washers 106', 112' and 118' can be helpful to achieve a desired level of contact or clearance to between the axial end faces of the helical pinions and the first and second shoes 164' and 184'. Construction in this manner renders the first and second helical pinions 108' and 116' less prone to tipping.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A differential assembly comprising:
    a case assembly comprising a case body and a case cover, the case assembly defining a plurality of first pin apertures and a plurality of second pin apertures, the case body defining an interior cavity and a plurality of shoe recesses, the interior cavity having an interior wall surface, the case cover being fixedly coupled to the case body;
    a plurality of first shoes integrally formed with the case body;
    a plurality of first helical pinions received in the interior cavity, each of the first helical pinions having a first pin portion that is received in an associated one of the first pin apertures;
    a plurality of second shoes unitarily and integrally formed with the case cover, each of the second shoes being received in an associated one of the shoe recesses to index the case cover relative to the case body;
    a plurality of second helical pinions received in the interior cavity, each of the second helical pinions having a second pin portion that is received in an associated one of the second pin apertures;
    a first side gear received in the interior cavity and meshingly engaging each of the first helical pinions; and
    a second side gear received in the interior cavity and meshingly engaging each of the second helical pinions;
    wherein the first and second helical pinions frictionally engage the interior wall surface of the case body in response to a reaction force generated by meshing engagement with the first and second side gears, respectively, to thereby limit differential motion between the first and second side gears.

2. The differential assembly of claim 1, further comprising a ring gear coupled to the case body.

3. The differential assembly of claim 2, wherein the case body includes a radially outwardly extending flange to which the ring gear is coupled.

4. The differential assembly of claim 3, wherein the ring gear is welded to the flange.

5. The differential assembly of claim 4, wherein a ring of a filler material is disposed between the flange and the ring gear.

6. The differential assembly of claim 5, wherein the ring gear has a chamfered end face that is abutted against a chamfered end face on the filler material to thereby center the ring gear about the case body.

7. The differential assembly of claim 1, wherein at least a portion of the case cover, at least a portion of the case body or both at least a portion of the case cover and at least a portion of the case body is heat treated.

8. The differential assembly of claim 7, wherein a nitride layer is formed over the at least the portion of the case cover, the at least the portion of the case body or both the at least the portion of the case cover and the at least the portion of the case body.

9. The differential assembly of claim 1, wherein the case body includes a circumferentially extending retaining rib that engages the case cover in a press-fit manner.

10. The differential assembly of claim 9, wherein the retaining rib extends in an unbroken manner.

11. The differential assembly of claim 9, wherein the case cover is abutted against a shoulder formed on the case body and wherein an undercut groove is disposed on the case body between the retaining rib and the shoulder, the undercut groove forming a radial space between the case body and the case cover.

12. The differential assembly of claim 1, wherein the first pin apertures are formed in one of the case body and the case cover.

13. The differential assembly of claim 12, wherein the second pin apertures are formed in the one of the case body and the case cover.

14. The differential assembly of claim 1, wherein the first pin apertures are formed in the first shoes.

15. The differential assembly of claim 14, wherein the second pin apertures are formed in the second shoes.

16. A differential assembly comprising:
   a case assembly comprising a case body and a case cover, the case assembly defining a plurality of first pin apertures and a plurality of second pin apertures, the case body defining an interior cavity and a plurality of shoe recesses, the interior cavity having an interior wall surface, the case cover being fixedly coupled to the case body;
   a plurality of first shoes integrally formed with the case body;
   a plurality of first helical pinions received in the interior cavity, each of the first helical pinions having a first pin portion that is received in an associated one of the first pin apertures;
   a plurality of second shoes unitarily and integrally formed with the case cover;
   a plurality of second helical pinions received in the interior cavity, each of the second helical pinions having a second pin portion that is received in an associated one of the second pin apertures;
   a first side gear received in the interior cavity and meshingly engaging each of the first helical pinions; and
   a second side gear received in the interior cavity and meshingly engaging each of the second helical pinions;
   wherein the first and second helical pinions frictionally engage the interior wall surface of the case body in response to a reaction force generated by meshing engagement with the first and second side gears, respectively, to thereby limit differential motion between the first and second side gears.

17. The differential assembly of claim 16, wherein the case body includes a radially outwardly extending flange and a ring gear is coupled to the flange.

18. The differential assembly of claim 17, wherein the ring gear is welded to the flange.

19. The differential assembly of claim 18, wherein a ring of a filler material is disposed between the flange and the ring gear.

20. The differential assembly of claim 19, wherein the ring gear has a chamfered end face that is abutted against a chamfered end face on the filler material to thereby center the ring gear about the case body.

21. The differential assembly of claim 16, wherein at least a portion of the case cover, at least a portion of the case body or both at least a portion of the case cover and at least a portion of the case body is heat treated.

22. The differential assembly of claim 21, wherein a nitride layer is formed over the at least the portion of the case cover, the at least the portion of the case body or both the at least the portion of the case cover and the at least the portion of the case body.

23. The differential assembly of claim 16, wherein the case body includes a circumferentially extending retaining rib that engages the case cover in a press-fit manner.

24. A differential assembly comprising:
   a case body defining an interior cavity with an interior wall surface;
   a plurality of first shoes integrally formed with the case body, each of the first shoes having a first pin aperture, each of the first shoes being disposed in the interior cavity;
   a plurality of first helical pinions received in the interior cavity, each of the first helical pinions having a first pin portion that is received in an associated one of the first pin apertures;
   a case cover fixedly coupled to the case body;
   a plurality of second shoes unitarily and integrally formed with the case cover, each of the second shoes having a second pin aperture;
   a plurality of second helical pinions received in the interior cavity, each of the second helical pinions having a second pin portion that is received in an associated one of the second pin apertures;
   a first side gear received in the interior cavity and meshingly engaging each of the first helical pinions; and
   a second side gear received in the interior cavity and meshingly engaging each of the second helical pinions;
   wherein the case body and the case cover are keyed to one another to orient the case cover relative to the case, and wherein the first and second helical pinions frictionally engage the interior wall surface of the case body in response to a reaction force generated by meshing engagement with the first and second side gears, respectively, to thereby limit differential motion between the first and second side gears.

* * * * *